United States Patent [19]
Allen

[11] 3,921,684
[45] Nov. 25, 1975

[54] APPARATUS FOR COUPLING OIL LOADING HOSE AND OTHER CONDUIT WITH A STORAGE TANK FILL PIPE

[76] Inventor: Lawrence P. Allen, Seven Shore Rd., Bourne, Mass. 02532

[22] Filed: Dec. 19, 1973

[21] Appl. No.: 425,963

[52] U.S. Cl. ............... 141/279; 114/230; 141/382; 285/24
[51] Int. Cl.² ...................... B65B 3/04; B67C 3/34
[58] Field of Search.......... 9/8 P; 114/230; 137/236, 137/236.5; 141/1, 279, 284, 387, 388, 382; 214/13, 14; 285/24, 27

[56] References Cited
UNITED STATES PATENTS

| | | | |
|---|---|---|---|
| 2,818,891 | 1/1958 | Loeser | 141/388 |
| 3,032,082 | 5/1962 | Vilain | 141/388 |
| 3,199,553 | 8/1965 | Garrett et al. | 141/388 |
| 3,773,093 | 11/1973 | Eustace | 141/279 X |

*Primary Examiner*—Richard E. Aegerter
*Assistant Examiner*—Frederick R. Schmidt
*Attorney, Agent, or Firm*—Munroe H. Hamilton

[57] ABSTRACT

Movement of a fluid conduit member into and out of coupling engagement with a fill pipe or manifold of a storage tank is carried out rapidly by means of a power actuated coupling apparatus constructed and arranged to be deck-mounted on a deck surface or platform area of a ship or dock or other fluid-loading facility. The coupling apparatus is especially designed to handle oil loading hose of a relatively large diameter and weight as utilized in connecting a supply depot with an oil tanker storage tank. Included in the coupling apparatus is a hose retaining structure for supporting an end of the oil loading hose above a deck surface in a position of axial alignment with a fill pipe opening. The hose retaining structure is received on a reciprocating carriage mounted on the deck at one side of the fill pipe and adjustable to move the axially aligned end of hose into coupling engagement with the fill pipe. Means are provided in the hose retaining apparatus for releasably engaging an end of the hose as it is brought in over the side of a deck area of a dock or an oil tanker and pulling the end into the position of axial alignment noted.

2 Claims, 27 Drawing Figures

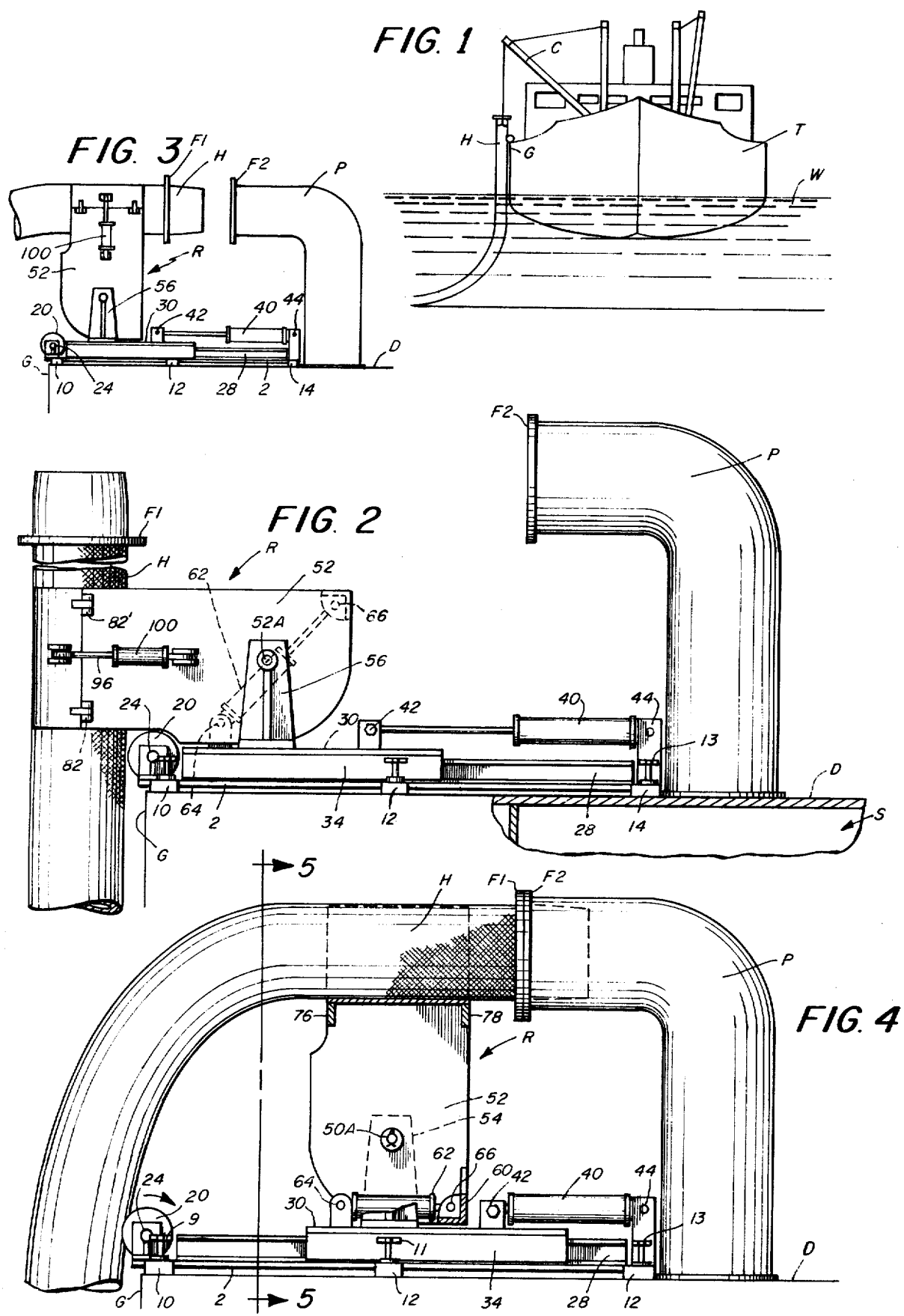

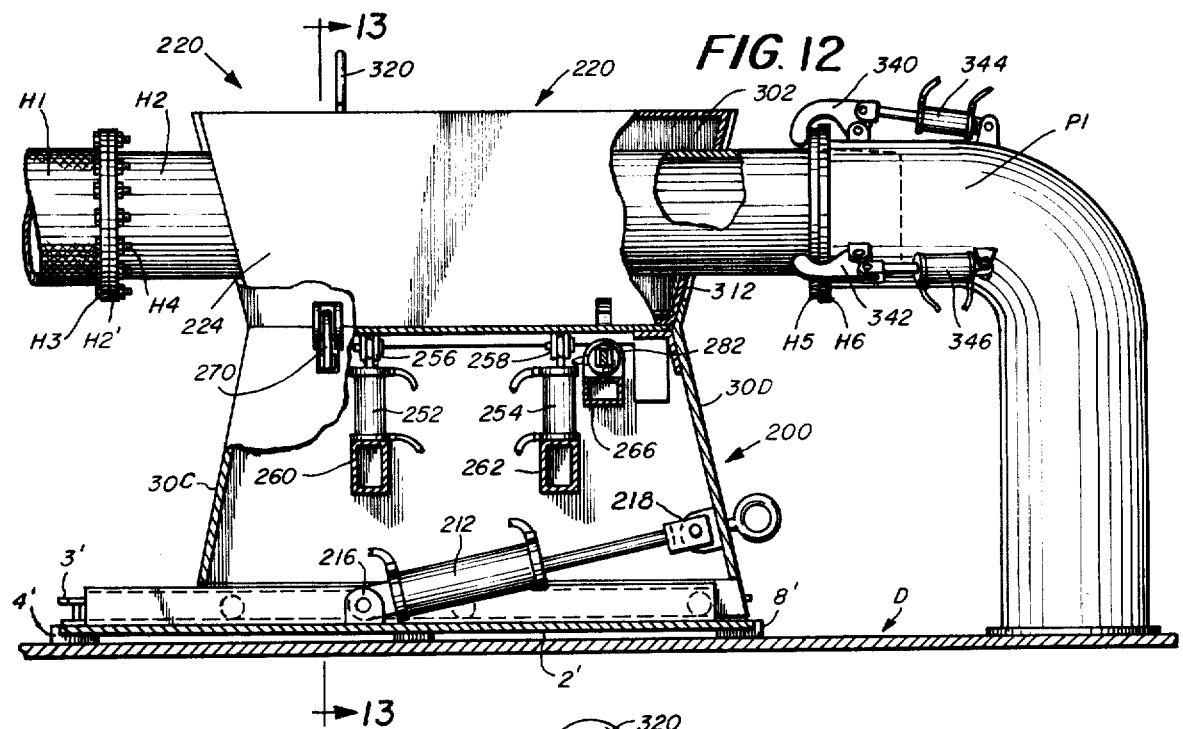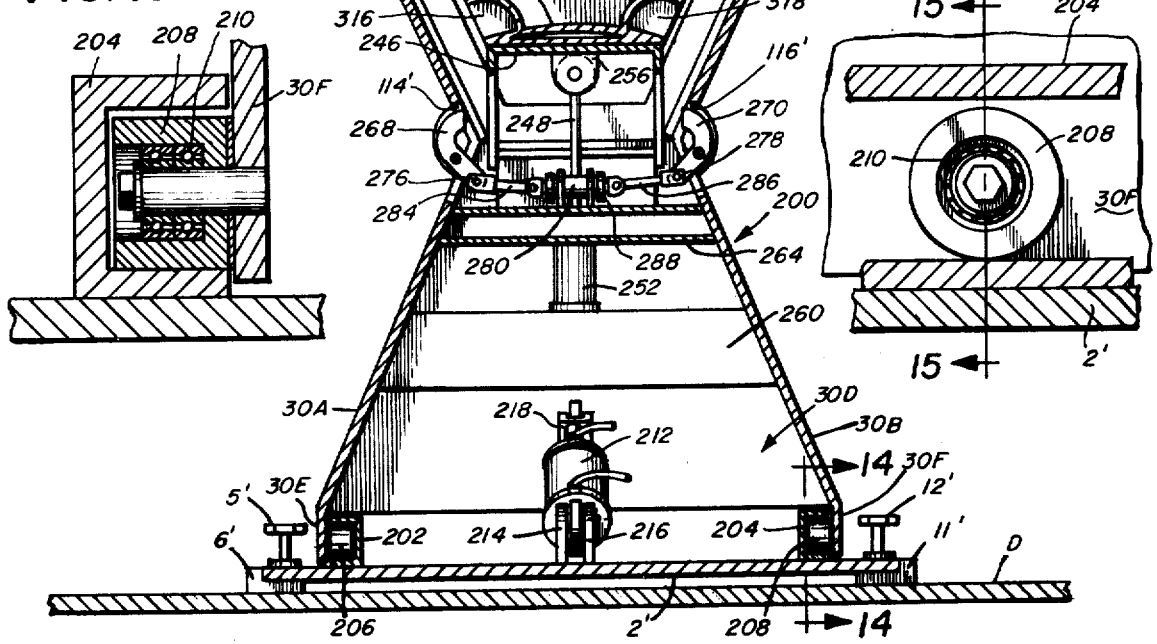

APPARATUS FOR COUPLING OIL LOADING HOSE AND OTHER CONDUIT WITH A STORAGE TANK FILL PIPE

This invention relates in general to the field of transporting fluid material such as crude oil, and to the handling of oil loading hose utilized to connect an oil tanker storage tank with a dock storage or other fluid loading facility. More particularly, the invention is concerned with a coupling apparatus for moving an oil loading hose into and out of coupling engagement with a fill pipe or manifold of an oil tanker storage tank in a mechanically controlled manner such that manual handling of oil loading hose by workmen may be eliminated or substantially reduced.

The operation of handling oil loading hose when connecting the hose to a fill pipe of a storage tank is attended by a number of difficulties especially when the storage tank is located in a barge, oil tanker, or other transport vessel. It is presently the custom in the art to utilize oil loading hose of relatively large diameters ranging from diameters of from 5 to 10 inches up to 15 inches or more. In these larger sizes, the hose material may have a weight of from 25 pounds up to 50 pounds per lineal foot, and is further characterized by a small bending radius. To couple a hose end of this type to a desired fill pipe or manifold, it is further the present custom to employ a bolted flange connection in which flange bolts openings have to be aligned and flange bolts inserted. This is recognized as a dangerous operation, and injury to workmen is common, particularly when the hose is moved by means of a crane.

Problems also arise due to a tanker drifting relative to a dockside where oil loading is carried out, as well as rise and fall due to change in ballast. This is even more the case when the tanker is required to make a hose connection with an underwater conduit line located at a considerable distance from a shore storage depot.

To deal with the problems of change in ballast and drifting during a dockside oil loading operation, it has been proposed in the art to employ a quayside loading and discharging installation for oil tankers in which a gantry rig is employed as disclosed in U.S. Pat. No. 3,032,082, and the hose is suspended in midair and moved into a coupling position by means of a control windlass device. Since this gantry rig arrangement is required to be mounted on a dockside, it is limited in its application and so far as known, its use has not been successfully adopted by the oil transporting industry.

It is a chief object of the invention, therefore, to provide a solution to the difficulties inherent in handling oil loading hose under the conditions indicated and to devise an improved coupling apparatus which can be installed on a deck surface comprised by either an oil tanker deck or a deck area on a loading dock.

Another object is to provide a coupling apparatus in which means are provided for releasably holding an end of an oil loading hose in fixed axial alignment with a fill pipe aperture.

Still another object is to provide a hose retaining structure by means of which a hose end may be engaged and pulled into a desired position of adjustment on a deck surface.

Still another more specific object is to provide a device for engaging with a hose end in a vertically disposed position as occurs when a hose is raised in a sea-loading operation.

Still another object is to devise a device for tilting or bending a vertically disposed hose end in a sea-loading operation to align the hose end with a horizontally disposed fill pipe opening.

Still another object is to provide a hose retaining structure and movable carriage in which an end of a hose may be located and secured in a horizontally disposed position and thereafter moved into coupling engagement with a fill pipe in suitably centered relationship to provide for rapid bolting together of connecting flange parts.

With these objectives in mind, I have conceived of a method of handling oil loading hose with a coupling apparatus which may be deck-mounted either on an oil tanker or a docking platform. The method of handling is based on the use of a special hose retaining structure together with power actuated means for moving the hose retaining structure and hose end toward and away from a fill pipe or manifold.

The nature of the invention and its other objects and novel features will be more fully understood and appreciated from the following description of a preferred embodiment of the invention selected for purposes of illustration and shown in the accompanying drawings, in which:

FIG. 1 is a diagrammatic view illustrating an oil tanker supported in a body of water and further indicating an oil loading hose having been raised from a submerged position to carry out a sea oil loading operation;

FIG. 2 is an elevational view of the coupling apparatus of the invention in one preferred form shown deck-mounted at one side of a fill pipe of the tanker of FIG. 1 and also indicating fragmentarily a portion of an oil loading hose engaged in a vertically disposed position as shown in FIG. 1;

FIG. 3 is another side elevational view of the parts indicated in FIG. 2 and further indicating the oil loading hose tilted or bent into a horizontally disposed position in axial alignment with the fill pipe of the tanker;

FIG. 4 is a side elevational view similar to FIGS. 2 and 3 but further indicating the step of moving the axially aligned oil loading hose into coupling engagement with the fill pipe.

FIG. 12 is a side elevational view of the structure shown in FIGS. 10 and 11 and further indicating power drive means and clamping devices;

FIG. 13 is a cross section taken on the line 13—13 of FIG. 12;

FIG. 14 is a cross section taken on the line 14—14 of FIG. 13;

FIG. 15 is a cross section taken on the line 15—15 of FIG. 14;

Figure 9:
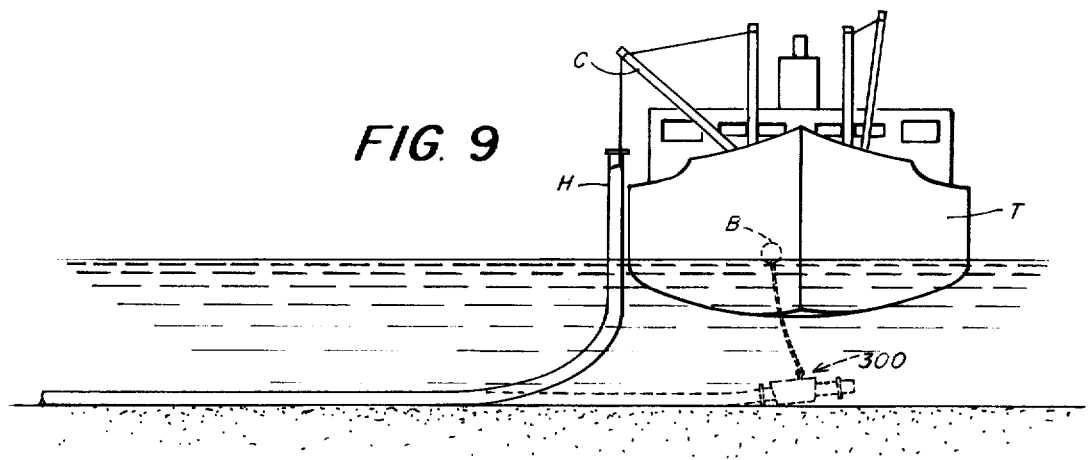
FIG. 9 is a diagrammatic view of an alternate oil tanker oil loading operation in which a submerged oil loading hose is indicated in two different positions.

In general the structures shown in the above-described FIGS. are intended to illustrate two preferred embodiments of means for carrying out the coupling method of the invention, and it is pointed out that each of the embodiments generally includes two basic parts comprising (1) a hose retaining mechanism for for supporting an end of a hose above a deck surface and in a position of axial alignment with a fill pipe of a storage tank, and (2) a reciprocating carriage for mechanically moving the hose retaining means and an end of hose into and out of coupling engagement with the fill pipe. FIGS. 1 to 7 illlustrate one preferred embodiment of coupling apparatus shown in use with a sea oil loading hose which is normally submerged, as shown in FIG. 9, and lying some distance from the shore line and which is raised into a vertically disposed position before being brought in over the side of an oil tanker.

FIGS. 8 to 26 illustrate another preferred embodiment of the coupling apparatus of the invention shown in use with a dock oil loading operation wherein the loading hose is brought in over a deckside without being raised into a vertically projecting position above the deck.

Referring more in detail to the coupling apparatus shown in FIGS. 1 to 7, inclusive, an oil tanker T is illustrated diagrammatically in FIG. 1 having a fill pipe or manifold P which communicates with one or more storage tanks S located below a deck surface D, as indicated diagrammatically in FIG. 2. The oil tanker is supported in a body of water W at the bottom of which is located a sea oil loading hose member H. This hose member H is intended to be illustrative of a typical offshore loading facility which connects with a storage transport depot located at some distance away on a shore area. As suggested in FIG. 9, the loading hose normally rests on the ocean bottom and has attached a chain and locating buoy B.

In FIG. 1, an end of hose H, earlier located by the buoy B is shown after having been pulled up along one side of the tanker T by means of a crane C. A commonly encountered problem present in thus raising a submerged hose of large diameter from a bottom area is the necessity for lifting the hose end into a position in which it projects vertically upwardly above the deck surface a considerable distance. This is due to the fact that the hose has a very low bending radius and a substantial length must be available before bending or flexing can occur. This makes a coupling operation highly difficult and dangerous, especially if there is a rough sea running. In a conventional loading instance, the hose may be raised a distance of thirty to forty feet above deck level before the upper end can be titled into a position for alignment with a fill pipe whose fill aperture lies in a vertical plane.

In carrying out one desirable method of coupling for overcoming the difficulties noted, I have devised a form of deck-mounted coupling apparatus which is constructed and arranged to engage with the hose H while in a vertically disposed position at the side of the tanker, as indicated in FIG. 1. In order to engage an end section of the vertically disposed hose end, I provide for the coupling apparatus being solidly secured to the deck surface at one side of a fill pipe P and at points very close to the gunwale G of the tanker T over which the hose end H is to be moved, as suggested in FIGS. 2, 3 and 4.

The principal parts of my improved coupling apparatus include a hose retaining device which can be secured around the outer surface of the hose end section, and a reciprocating carriage for moving the hose retaining device and an attached hose section toward and away from the fill pipe P. Considering the coupling structure in greater detail, numeral 2 denotes a base member which may, for example, consist in a relatively heavy gauge steel plate solidly anchored to deck D by means of angle iron brackets as 4, 6, 8, 10, 12, and 14, through which are fastened threaded members ad 3, 5, 7, 9, 11, and 13. It is intended that the base 2, together with the rest of the coupling apparatus which it supports, may be readily detached from the deck D so that it may be lifted by the crane C and stored below deck when not in use. For this purpose, the threaded fastenings may consist in cap screws of rugged construction readily unscrewed by a deck crewman and the brackets may be permanently welded or otherwise secured to the deck so that the coupling apparatus can be quickly put back in an operative position when needed.

It will be understood that the particular deck arrangement disclosed is intended to be illustrative of various arrangements depending upon the structural design of the tanker deck section which is being used as a platform. In one preferred installation, as shown in FIGS. 1 to 4, one end of the base, together with holding brackets 4 and 10, is located in close proximity to a section of the tanker side at which the gunwale has been cut away to deck level. This location of the base 2 is especially designed to support an end portion of the hose H against a roller assembly in the base over which the hose may be guided as it is pulled into a desired coupling position.

As shown in FIG. 1, the roller assembly includes an elongated roll member 20 which is mounted for free rotative movement in end bearings as 22 and 24, solidly secured at the upper side of the base 2. The roller 20 is preferably designed with a concaved peripheral surface whose arc of curvature may be complementary with that of the hose section, and which may be varied to conform to other sizes of hose which are to be contacted and guided. It is pointed out that in this preferred arrangement the roller periphery is located so as to project outwardly over the gunwale or side G for a short distance so that it may receive the hose H thereagainst in slightly spaced relation to the gunwale G as is more clearly shown in FIGS. 2 and 3.

Figure 5:
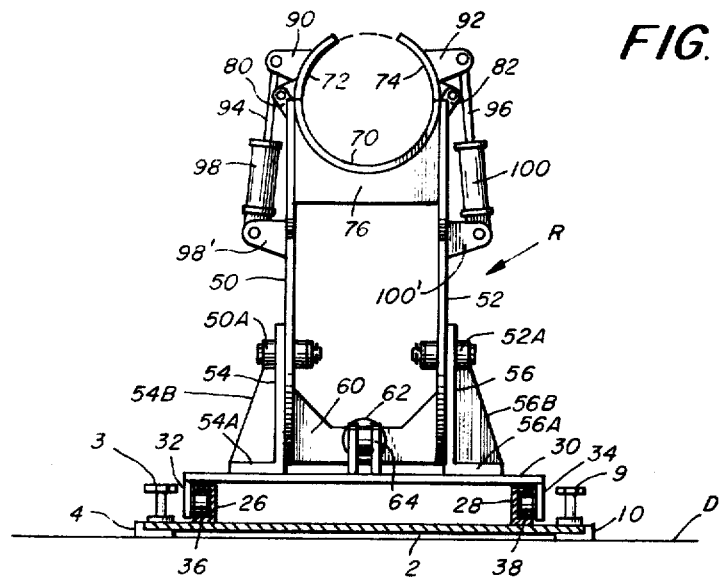
FIG. 5 is a cross section taken on the line 5—5 of FIG. 4.
Figure 7:
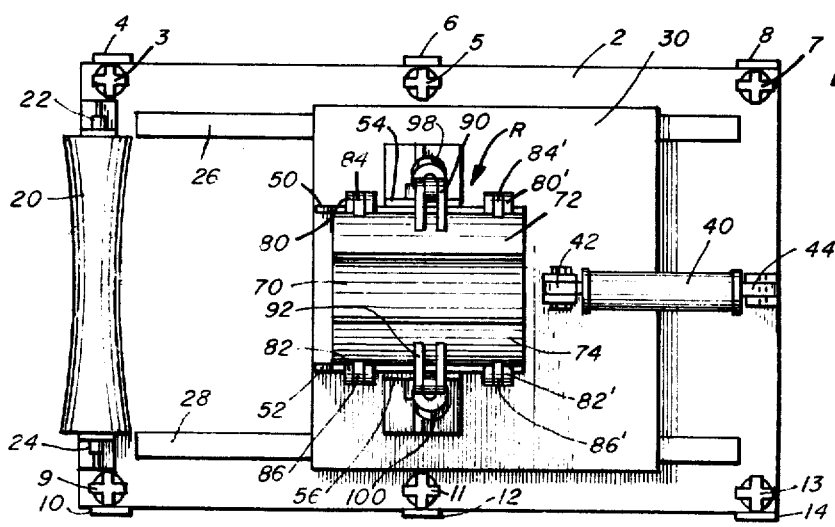
FIG. 7 is a plan view of the coupling apparatus shown in FIGS. 2 to 4, inclusive, and further indicating details of a base structure and a hose guide roll arrangement.
Figure 8:
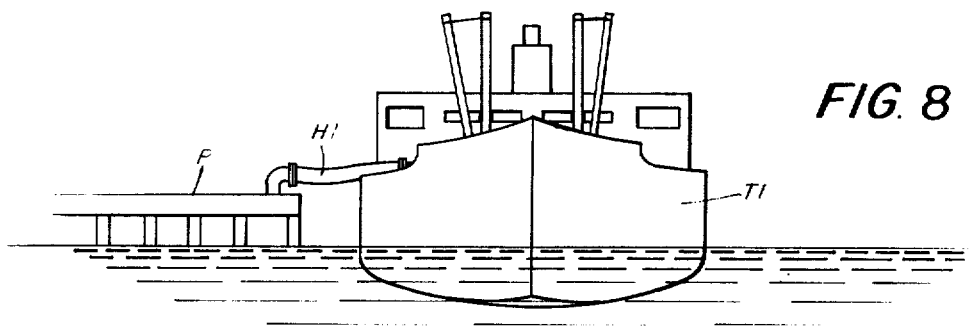
FIG. 8 is a diagrammatic view illustrating an oil tanker moored at the side of a storage dock facility with a dockside oil loading operation being carried out.

Mounted adjacent to the roller 20 on the upper side of the base 2 and extending rearwardly therefrom are channel tracks or rails 26 and 28 welded or otherwise fastened to extend in spaced apart relation along two opposite sides of the base 2, as indicated in FIGS. 5 and 7. On the tracks or rails 26 and 28, I provide a reciprocating carriage which is constructed with a flat top section of, for example, heavy gauge steel and depending from the flat top section are vertical side sections 32 and 34. It will be observed that the vertical sides 32 and 34 are spaced apart a distance such that they overlie slightly the channel tracks 26 and 28 and rotatably mounted within the sides 32 and 34 are sets of rolls as 36 and 38 arranged to be received in rolling engagement with the channel tracks 26 and 28 as shown in FIG. 5.

Reciprocating movement of the carriage along the tracks 26 and 28 is carried out by means of a fluid pressure actuated cylinder and piston unit 40, pivotally anchored to the top section 30 of the carriage in a bracket 42, and having its opposite end similarly anchored to the upper side of the base 2 in a bracket 44. It will be understood that the cylinder unit 40 may be operated by hydraulic or pneumatic pressure means with compressed air available on most oil tankers being preferred, and as will be hereinafter described in detail, operation of the cylinder unit may be actuated either by a manual or automatic sequencing controls.

In combination with the base 2 and the carriage structure noted, I have further devised a special hose retaining means which is supported at the upper part of the movable carriage in a raised position and which can be independently engaged and disengaged with an outer peripheral surface of the hose end H when the latter member is in a vertically projecting position along a side of the tanker T. This hose retaining means comprises a power driven cradle structure which is rotatable about a horizontal axis and which can be swung into close proximity to a section of the loading hose H when in its vertically projecting position above deck as suggested in FIG. 1. Arrow R generally denotes the hose retaining means. Included in the rotatable cradle structure is a lower body portion and a hose gripping jaw mechanism supported at the upper side of the body portion. As shown in the drawings, and in particular FIGS. 5 and 6, I construct the body portion with a pair of vertically disposed spaced apart retaining walls 50 and 52 which may be made of heavy gauge steel plate, for example. These retaining walls are mounted for rotative movement in bearings 50a and 52a received through upper ends of respective angle iron braces 54 and 56. The angle iron braces 54 and 56 have respective base sections 54a and 56a rigidly secured as by welding to the upper side of the member 30, and they are further provided with reinforcing gussets 54b and 56b to impart a high degree of rigidity and resistance to torque forces throughout the cradle structure.

In addition to the angle iron bracing, I further provide a lower steel bridging wall 60 which, as indicated in FIG. 5, is received between inner surfaces of the sides 50 and 52 with its lower edge terminating in spaced relation above the upper surface of carriage member 30, as shown in FIG. 5. Attached centrally of the bridging wall 60 on a bracket 66 is a fluid pressure actuated cylinder 62. The opposite end of cylinder 62 is pivotally attached to a bracket assembly 64 welded or otherwise secured at the upper side of the carriage top 30, as best shown in FIG. 4. It will be apparent that extending the plunger element of the piston 62 operates to rotate the carriage in a counterclockwise direction, as indicated in dotted lines in FIG. 2.

The hose gripping jaw mechanism as shown in FIGS. 4 to 7, inclusive, consists in a fixed jaw portion 70 and adjustable jaw portions 72 and 74. The fixed jaw portion 70 comprises a semi-cylindrical body, opposite ends of which are supported on transverse wall sections as 76 and 78. The arc of curvature of this semi-cylindrical fixed jaw is preferably chosen of a radius corresponding to or exceeding the radius of the hose section H to be engaged.

Figure 6:
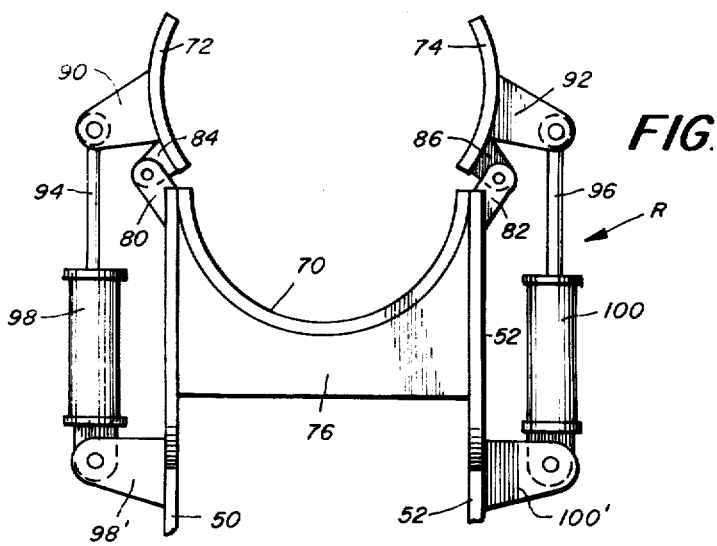
FIG. 6 is a detail view of the hose gripping jaw device of the invention.

The adjustable jaw sections 72 and 74 are pivotally received on linkages which include respective sets of slotted arms 80, 82, 80', 82' angularly fixed to the upper ends of walls 50 and 52 as shown in FIG. 6. Pinned in slotted arms are sets of lug portions 84, 86, 84' and 86' which are secured to respective jaw portions 72 and 74. Located centrally of the jaws 72 and 74 above the sets of lugs 84, 86, 84' and 86' are slotted arms 90 and 92 in which are pivotally attached piston rods 94 and 96 respective cylinder units 98 and 100. Lower ends of the cylinders 98 and 100 are pinned in slotted arms 98' and 100' supported on walls 50 and 52 as shown in FIG. 5 and 6. Actuating the cylinders 98 and 100 moves the jaws from the gripping position shown in FIG. 5 to the opened position shown in FIG. 6 for engaging a hose section. In the gripping position shown in FIG. 5, it will be noted that the jaws 72 and 74 do not meet, but rather lie in a spaced apart position to better accommodate varying hose diameters.

By means of the combined carriage, cradle and jaw mechanism described, an efficient and rapid coupling operation may be carried out in the following manner. Assuming the reciprocating carriage, cradle and jaw mechanism is in a position such as that indicated in FIG. 7, the cylinder 40 is actuated to advance the carriage toward the side of the tanker. The rotatable carriage R is then swung about a horizontal axis onto a position such that shown in FIG. 2 by means of the cylinder unit 62. The adjustable jaws 72 and 74 are then clamped about opposite peripheral surfaces of the hose H by means of the cylinder units 98 and 100.

With the hose section thus firmly clamped through the rotatable carriage, the cylinder 62 is operated to retract its piston element and the hose H is tilted or bent over into a position in which the end of the hose is gradually brought into a horizontally aligned position with respect to a fill aperture in the fill pipe P as suggested in FIG. 3.

When thus aligned, the hose H is drawn in over the deck side in rolling contact with the roller 20 by actuating the cylinder 40 and retracting the carriage until the end of the hose is moved into a fully coupled engagement with the fill pipe as suggested in FIG. 4. The flanges F1 and F2 are then secured together by bolts or other fastening means and loading of oil is carried out until the storage tank S is fully loaded, at which point the above-described steps may be reversed to rapidly detach the hose H and return it to a position in which is may fall back over the side of the tanker deck.

FIGS. 8 to 23 illustrate another desirable form of hose coupling apparatus of the invention in which a hose retaining means is provided for dealing with an oil loading hose which is at the side of a dock, for example, and not required to be raised up out of the sea into a vertically projecting position above the deck surface. Instead, the hose may be led in over a deck gunwale and roller device similar to roll 20 of FIG. 7 in a generally inclined or horizontally disposed position. Thus, as shown diagrammatically in FIG. 8, a tanker T1 is docked beside a pier P and an oil hose H extends across the space between the dock and tanker deck in an inclined or horizontally disposed position.

In general, this dock loading type of hose coupling apparatus is somewhat similar to the coupling apparatus of FIGS. 1 to 7 and includes a hose retaining mechanism and a reciprocating carriage which is designed to be deck-mounted on the deck of an oil tanker, barge or the like. In addition to these parts, I may also employ a hose adapter unit as hereinafter disclosed in detail. I may also desire to install this dock loading type of coupling apparatus on a platform of a pier or land based loading facility.

Figure 10:
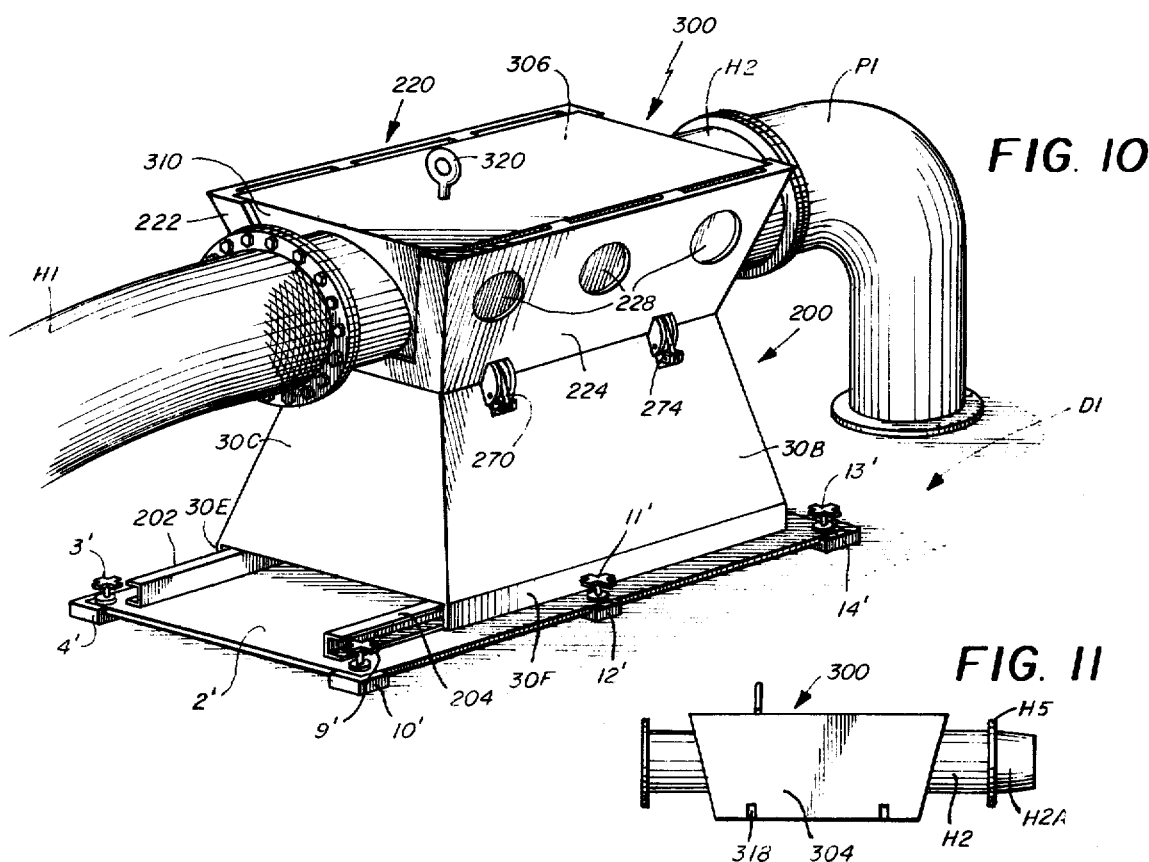
FIG. 10 is a perspective view of another preferred form of hose coupling apparatus of the invention.

As shown in FIG. 10, a fill pipe P1 is vertically received in a deck D1 of tanker T1 communicating with one or more storage tanks located below deck. Mounted at one side of the pipe P1 and at points adjacent to the gunwale of the tanker T1 is a base member 2' which is detachably secured to the deck D1 by means of angle brackets 4', 6', 8', 10', 12', and 14', solidly fastened to the deck and through which are received threaded fastenings as 3', 5', 7', 9', 11' and 13'. As was the case with the coupling apparatus of FIGS. 1 to 7, the base 2' and all structure mounted thereon may be detached from the deck and moved to a desired storage facility when desired.

Supported on this base 2' is a reciprocating carriage generally indicated by arrow 200. The carriage is mounted for reciprocating travel on tracks or rails 202 and 204, fixed to the upper side of the base 2' as indicated in FIG. 10. As shown in FIGS. 10, 12 and 13, the carriage comprises a cradle supporting housing of a somewhat pyramidally shaped appearance. This housing includes two side walls 30a and 30b and two end walls 30c and 30d. All of these walls extend upwardly in an inclined manner to provide a rigidly braced supporting enclosure for containing pressure actuated cylinder and piston units as described below. The walls 30a and 30b terminate at their bottom portions in vertical edges 30e and 30f as shown in FIG. 13 and rotatably supported in these vertical sides are sets of rollers or wheels as 206 and 208 arranged to engage in channeled portions of the tracks 202 and 204 and to rotate on bearings as 210 as indicated in more detail in FIGS. 14 and 15.

Located centrally of the base 2' in the housing enclosure is a fluid pressure actuated cylinder 212. The cylinder 212 is pivotally attached at one end in brackets as 214 and 216, as shown in FIG. 13, and has its piston element pivotally secured in a bracket 218 fixed to the end wall 30d of the housing, as is also shown in FIG. 13. Extending and retracting the cylinder plunger operates to move the carriage in a reciprocating path of travel as desired, and a suitable source of compressed air or fluid may be employed as before to actuate the cylinder.

Figure 22:
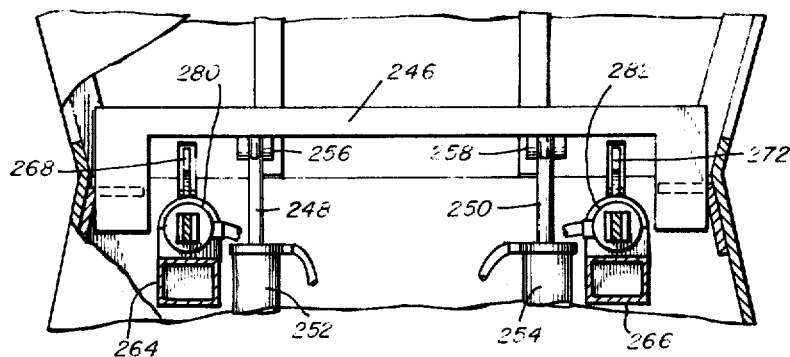
FIG. 22 is a fragmentary elevational view of fluid power actuating means.
Figure 23:
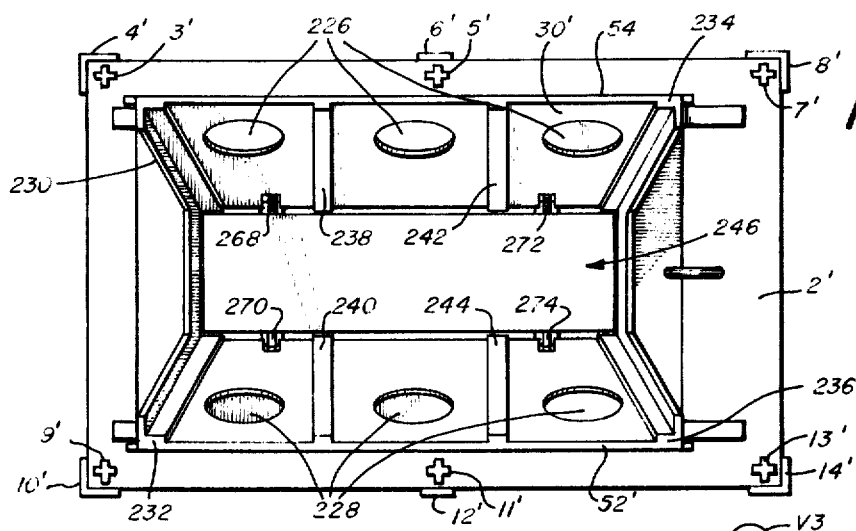
FIG. 23 is a plan view of a portion of a cradle mechanism.

Mounted at the upper portion of the housing 200 is a V-shaped cradle body generally indicated by the arrow 220 and formed with inclined side walls 222 and 224 which are provided with sets of apertures as 226 and 228 as best shown in FIGS. 10 and 23. At the ends of these side walls are provided retaining corner sections 230 and 232, 234, 236. Located between these angled corner sections of the side walls are spaced rib portions 238, 240, 242, 244. An adjustable bottom section of the cradle body is comprised by a vertically movable base 246 which is also shown in FIG. 22 and which has attached at the underside thereof piston rods 248 and 250 and respective cylinders 252 and 254. The piston rods 248 and 250 are pivotally attached in bracket members 256 and 258, as shown in FIG. 22, and the cylinders 252 and 254 are solidly secured to tubular frame parts 260 and 262 which are transversely secured between the sides 30a and 30b of the housing 200, more clearly indicated in FIGS. 12 and 13. Operation of the two cylinders functions to raise and lower the base 246 in the cradle body in the manner illustrated in FIG. 13.

Also transversely disposed between the side walls 30a and 30b and above the tubular parts 260, 262 are tubular frame parts as 264, 266 on which are pivotally supported two sets of interlocking jaws 268, 270, 272, 274. As is more clearly shown in FIG. 13, the interlocking jaws 268, 270 are attached by two sets of linkages as 276 and 278 to double-acting cylinders 280, 282 (FIG. 22) having piston rods as 284, 286 connected thereto. The cylinders 280, 282 are supported in brackets as 288, fixed on the tubular frame parts 264, 266.

In combination with the reciprocating carriage and its housing and V-shaped cradle structure, I further provide a housing adapter component 300 which is constructed of a shape complementary with the inner sides of the V-shaped cradle so that it may be fitted between the sides of the cradle. The adapter is designed to be located around an end section of hose H1 and to be utilized as a guide and locking means for positioning the hose end in a raised horizontal position in the cradle and for holding it in detachably fixed relation to the cradle structure.

Figure 11:
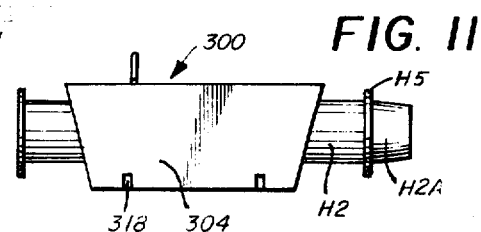
FIG. 11 is a detail elevational view of a component of the coupling apparatus shown associated with an oil loading hose member.

The hose adapter is shown installed on a hose member in FIG. 11 and is illustrated in greater detail in operative positions in FIGS. 10, 12, 13 and 16. As noted therein, the adapter includes V-shaped sides 302, 304 and top side 306, bottom 308 and end walls 310 and 312. Preferably the component parts are secured along their edges in sealed relationship. The end walls 310 and 312 are formed with openings through which a section of the hose H1 may be received. In some cases, I may desire to have the adapter constructed in two half sections which can be placed around opposite sides of the hose and secured by suitable welding or other means.

Figure 20:
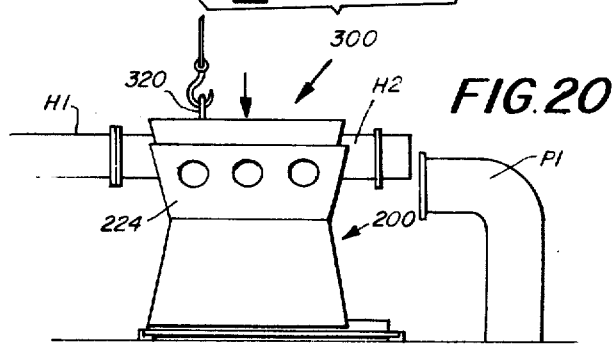
FIGS. 20 and 21 are schematic views illustrating steps of positioning an oil loading hose in a horizontally disposed position and moving it into coupling engagement.
Figure 21:
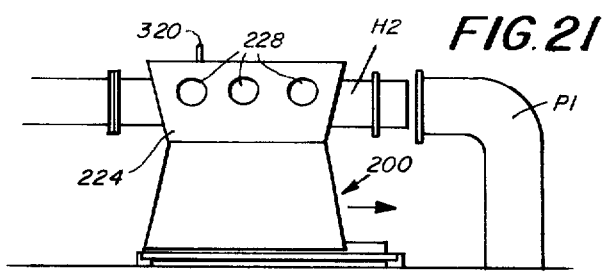

At the top side 306 of the adapter, there is solidly secured a ring bolt 302 which is designed to be engaged by a crane hook so that the hose H1 and attached adapter may be picked up and suggested in FIG. 20 and placed in the cradle structure in the seated position shown in FIG. 21. FIG. 12 also shows the adapter in a fully seated position with the bottom 308 resting upon the movable base 246 of the cradle. In this position, the V-shaped sides are fitted snugly against the rib portions 238, 242, 240 and 244 of the cradle. The corners of the adapter slidably engage in the retaining corners 230, 232, 234, 236 of the cradle to insure that the adapter may be precisely registered with a fill pipe aperture when received in the cradle.

Figure 16:
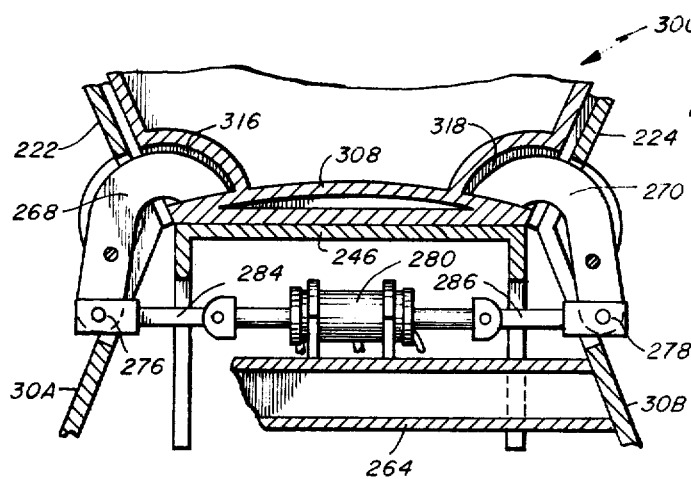
FIG. 16 is a fragmentary cross sectional view showing the clamping mechanism indicated in FIG. 13 in a holding position.

The sides 302 and 304 are further formed along their lower edges with spaced apart locking slots 316, 138 which are of a shape and size suitable for receiving therein extremities of respective jaws 268, 270. When the adapter is lowered into the cradle in a fully seated position, the jaws 268, 270 are actuated and move into a locking position in the slots 316 and 318 as is best shown in FIG. 16.

With the cradle and adapter thus attached, it will be understood that the carriage is moved by the cylinder 212 to fully engage the hose extremity in the aperture of the fill pipe P1 as shown in FIGS. 10 and 12. Pumping of oil is then carried out until loading is completed and the parts are ready to be disengaged.

Since the weight of the hose section is of a magnitude to cause the adapter to be forced tightly into the cradle, it is contemplated that the parts may tend to adhere to one another and resist separation. With this in mind, I have provided the movable base 246 earlier described. At the end of the loading operation, the cylinders 252, 254 are actuated to overcome any resistance to separation and to lift the base into the position shown in FIG. 13 with the adapter being completely separated from the cradle and in a position to be picked up by a crane.

It will be observed that the openings 226, 228 in the cradle side walls communicate with spaces between the ribs on the inner sides of the cradle and thus prevent the creation of an air lock between the cradle and adapter. It is also pointed out that the adapter component may be efficiently employed in different ways. It may be constructed in sections, as earlier described, so that it may be attached to a hose which is not equipped with an adapter part. Another preferable arrangement for some installations may consist in making up and having on hand special adapter enclosed hose sections of short length such as the hose section H2 shown in FIGS. 10 and 12. In these short length hose sections, one end of the hose H2 may be formed with a flange H2' to engage with a flange H3' of hose H1 and be bolted together by bolts as H4. At its other end, the hose section H2 may be formed with a flange portion H5 arranged to engage with the flange H6 of pipe P1. This unit is shown diagrammatically in FIG. 11 and it is intended that it may be held in storage to be used with any standard type of flanged hose which may be in use at a given docking facility or other loading stations.

Figure 17:
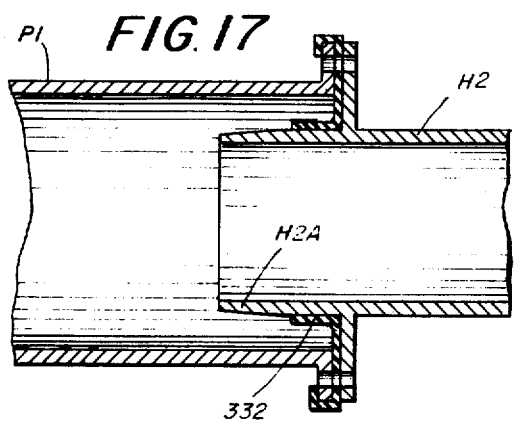
FIGS. 17 and 18 are detail cross sectional views of an alternate coupling arrangement.
Figure 18:
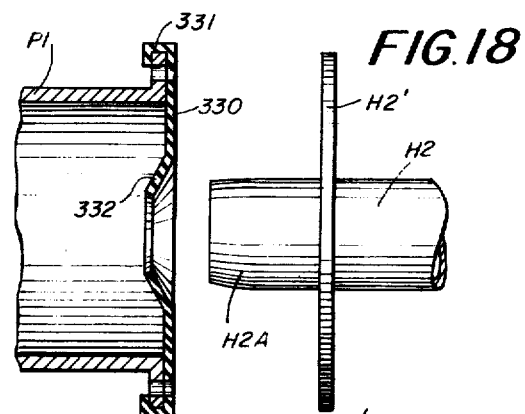
Figure 19:
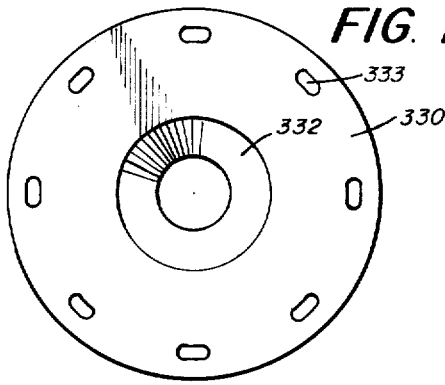
FIG. 19 is a detail end elevational view of one component of the structure shown in FIG. 18.

In thus using a separate hose section H2 with an enclosing adapter part, I may also provide for a modified form of sealing engagement of the hose H2 with the fill pipe P1. For example, as shown in FIG. 17, I may provide the hose end H2 with a flange H2' and a projecting extremity H2a. I also provide a sealing ring member 330 which, as shown in FIG. 19, is formed with a flexible cup portion 332. This sealing ring member has a channeled edge portion 331 for engaging around the flange edge of pipe P1 as shown in FIG. 18. By means of this arrangement the hose H2 may be engaged in a position as shown in FIG. 17 with the cupped portion 332 having been extended to overlie the end H2a of the hose H2. This provides for a quick coupling and sealing of the parts. Only a limited number of fastening elements may be required and these elements may be located through holes 333. However, with this sealing ring arrangement shown in FIG. 17, I may further desire to eliminate the use of any bolts or other fastenings and in place of this, a tightly held engagement of the parts is obtained by the use of retaining hooks, 340, 342 operated by hydraulic cylinders as 344, 346 mounted on P1, as shown in FIG. 12. There is thus realized a means of quickly disconnecting as well as quick connecting and thus may be very important under difficult loading conditions when a hose may have to be released overside on short notice.

In addition, the hose adapter 300 may also be employed as shown in FIG. 9 as a means of buoyantly supporting the end of a hose H slightly above the ocean floor or bottom to prevent the hose from becoming solidly embedded in mud or other material. In this case, the space between the hose and the surrounding walls of the adapter is completely sealed off to supply a buoyant air chamber of some determined degree of buoyancy as may be required.

Figure 24:
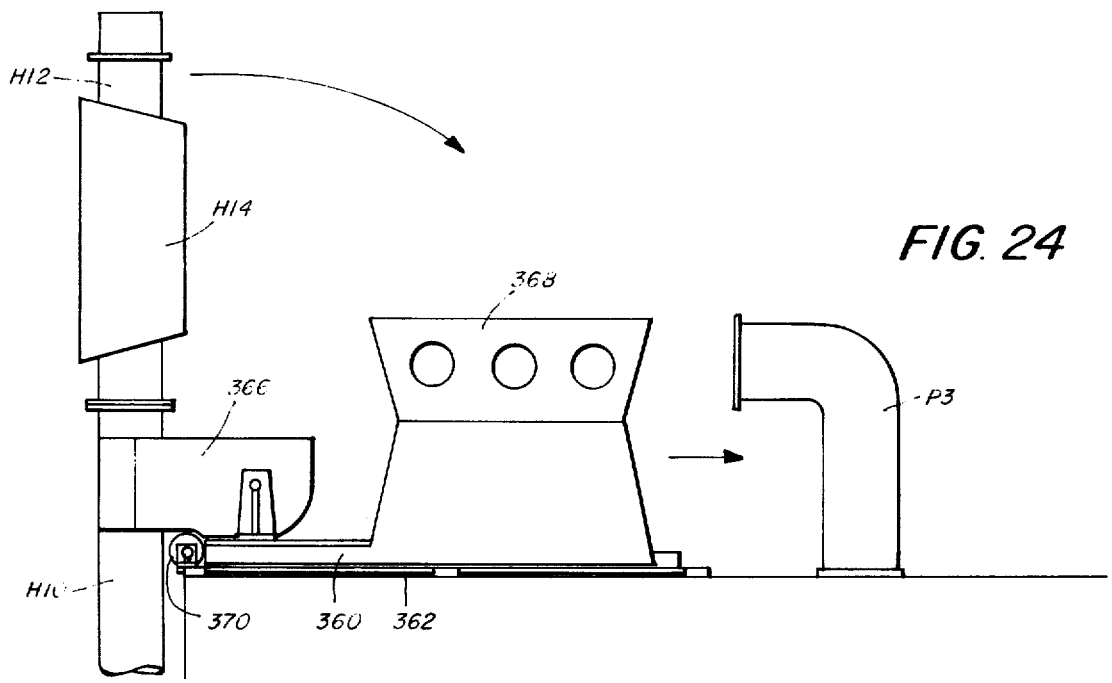
FIGS. 24 and 25 are diagrammatic views illustrating the coupling apparatus of FIGS. 1 to 7 inclusive shown in use with cradle structure of the type illustrated in FIG. 10.
Figure 25:
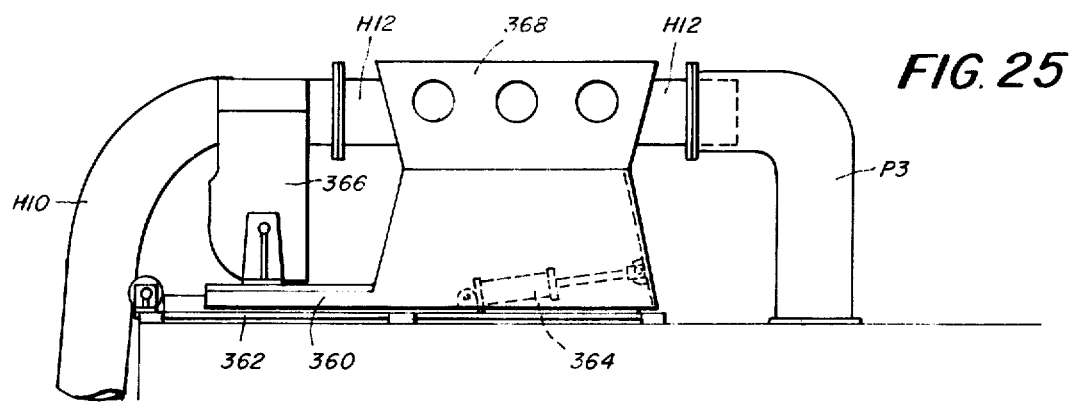

FIGS. 24 and 25 illustrate a modified form of the invention in which both the sea loading type coupling and the dock loading coupling are combined on one carriage of the same reciprocating class described. In this modification of FIGS. 24 and 25, numeral 360 denotes a reciprocating carriage movable along a base 362 and powered by a cylinder and piston unit 364. On this carriage is mounted a rotatable cradle member 366 and an adapter hose-receiving cradle 368 for handling hose H10 having an adapter hose section H12.

FIG. 24 illustrates the apparatus diagrammatically with the rotatable cradle 366 engaged about the hose part H10. FIG. 25 illustrates these parts with the hose section H12 and its adapter part H14 tilted into a horizontal position in which the adapter H14 has been located in the cradle 368 and the end of hose H12 has been moved over roller 370 into coupling engagement with the fill pipe P3. It is contemplated in this operation, the two forms of cradles cooperate with one another with the rotatable cradle opening to first engage with the hose H10 and tilt it out of vertically disposed position until it is received in the V-shaped cradle 368. A part of the load borne by the rotatable cradle is then assumed by the jaw members of the V-shaped cradle as they lock the hose end into a correctly aligned position of register with the aperture of the fill pipe P3. It is pointed out that by thus combining the turning force of the rotatable cradle with the locking strength and supporting capacity of the V-shaped cradle, less strain is imposed on each unit and a more rapid operation can be carried out with very little manual handling being required.

In operating the various fluid actuated cylinders and piston units, it may be desired to provide a control panel for suitable control means of conventional nature for all of the units. In such case, movement of the cylinders may be controlled individually by a control operator on the deck or at some other convenient location.

Figure 26:
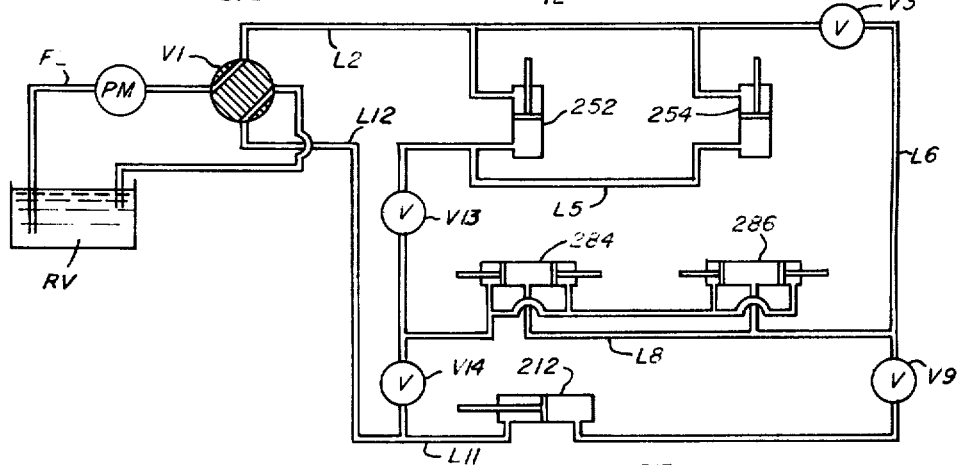
FIG. 26 is a diagrammatic view illustrating means for a fluid power actuated drive for sequential operation.

It may also be desired to carry out some of the operations in automatic sequence. For example, FIG. 26 illustrates a typical sequencing control diagram for a hydraulic system to handle a hose equipped with an adapter of the class described. This diagram does not include control of the rotatable cradle device as shown in FIGS. 1 to 7.

Figure 27:
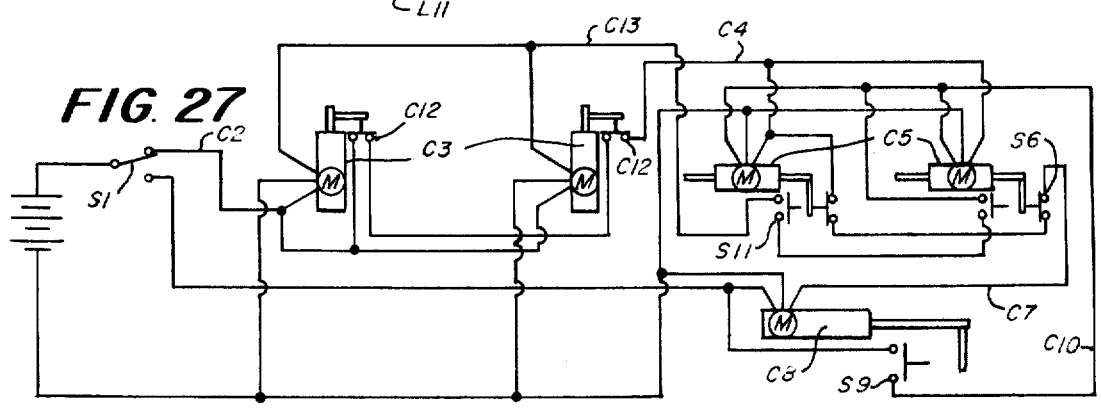
FIG. 27 is a diagrammatic view illustrating electrically powered means for driving the coupling apparatus in a desired sequence.

FIG. 27 illustrates a similar sequencing control diagram for an electrical system to handle a hose equipped with an adapter. FIG. 27 includes means for providing a locking sequence for handling a hose section having an adapter of the class described. It is assumed that the adapter equipped hose section has been picked up by a crane and placed on the bottom of the V-shaped cradle when the latter member is in a normal raised position.

In the locking sequence, valve V1 is rotated to the position shown and the pump PM is activated charging flow line L2 and forcing hydraulic pistons 252 and 254 downwardly thus lowering the hose adapter into the cradle. Hydraulic fluid on the reverse side of the pistons is forced into flow line L5 and returns to the reservoir RV by means of valve V1. When the pressure in line L2 builds up sufficiently, it opens valve V3 which is a pressure operated valve in one direction and a check valve in the other direction so as to allow for the return of fluid to the reservoir RV when the line pressure is in reverse.

When valve V3 opens, it charges line L6 thus operating cylinders 280 and 282, which locks in the adapter slots. Oil on the reverse side is fed back to the reservoir RV through line L8. Valve V9 operates when pressure is built up again and cylinder 212 is actuated which moves the cradle forward and couples the hose with the fill pipe. The force of the pump holds the cradle and carriage in a coupling position until valve V1 is turned lining up the feed line FL with the flow lines L2 and L12. Thus flow lines L12 and L11 become charged, retracting the piston 212 and disengaging the adapter from the fill pipe. The sequence continues in reverse until the adapter is raised out of the cradle ready to be picked up again by a crane. It will be understood that the diagram may be modified to include a control for the cylinders which actuate the rotatable cradle and its jaws where this may be desirable.

In FIG. 27, assuming again that an adapter equipped hose section has been placed on a cradle base with the latter in a raised position, switch 1 is closed to make contact with conductor C2 which activates electrical activators C3 into a down position in which the adapter is lowered into its cradle. The activators C3 in a down position operate switches C12 and close a circuit through C4. This circuit energizes activator C5 locking the adapter in the cradle, at the same time charging conductor C7 and activating C8 to move the cradle forwardly. Reversing the position of switch S1 energizes activator C8 and withdraws the hose, closing switch S11 and energizing conductor C13. This extends activator C3 and raises the adapter out of the cradle. If desired, each function may be individually controlled through separate sequencing switches S6, S11, S12 and S9. In this case also, additional switches may be included to automatically control the operation of the rotatable cradle and its jaw mechanism.

It will be apparent from the foregoing disclosure of the invention and I have provided a practical hose handling apparatus which can be installed for use either on a loading dock or on the dock of an oil tanker and that by means of the power actuated mechanism, a substantial reduction in manual labor may be achieved. Even more importantly, both the operation of coupling and uncoupling can be quickly carried out even when larger diameters of hose are employed.

I claim:

1. A coupling apparatus for receiving and guiding an oil loading hose into connected relationship with a fill pipe which is vertically disposed in the deck of an oil tanker and which is formed with a curved upper extremity having a fill aperture lying in a vertical plane in spaced relation to the deck, said coupling apparatus including a carriage mounted for reciprocating travel toward and away from the fill pipe along the said deck of the oil tanker, hose retaining means mounted in the carriage for locating an end of the said oil loading hose in a position of axial alignment with the said fill aperture, power driving means for moving the said carriage and guiding the axial aligned hose end into abutting relation with the curved upper extremity of the fill pipe, and said hose retaining means comprising a rotatable cradle structure and an adjustable jaw mechanism supported in the rotatable cradle for engaging the oil loading hose when in a vertically disposed position at one side of the tanker, means for closing the jaw mechanism around the said hose and means for rotating the cradle structure and jaw mechanism about a horizontal axis of rotation to locate the end of the hose in said position of axial alignment with the fill pipe.

2. An apparatus according to claim 1 in which the means for rotating the cradle structure consists in fluid pressure operated cylinders pivotally received in the reciprocating carriage and the means for closing the jaw mechanism consists in fluid pressure actuated cylinders pivotally received on the cradle structure at either side thereof.

* * * * *